United States Patent
Feilen et al.

(10) Patent No.: US 8,549,324 B2
(45) Date of Patent: Oct. 1, 2013

(54) METHOD FOR PROTECTING A MOTOR VEHICLE COMPONENT AGAINST MANIPULATIONS IN A CONTROL DEVICE AND CONTROL DEVICE

(75) Inventors: Oliver Feilen, Lenting (DE); Rudiger Stadtmuller, Ingolstadt/Etting (DE)

(73) Assignee: Audi AG, Ingolstadt (DE)

( * ) Notice: Subject to any disclaimer, the term of this patent is extended or adjusted under 35 U.S.C. 154(b) by 1260 days.

(21) Appl. No.: 10/525,230

(22) PCT Filed: Jul. 23, 2003

(86) PCT No.: PCT/EP03/08023
§ 371 (c)(1),
(2), (4) Date: Oct. 12, 2005

(87) PCT Pub. No.: WO2004/026641
PCT Pub. Date: Apr. 1, 2004

(65) Prior Publication Data
US 2006/0100757 A1    May 11, 2006

(30) Foreign Application Priority Data
Aug. 21, 2002  (DE) .................................. 102 38 094

(51) Int. Cl.
*G06F 12/14*  (2006.01)
*G06F 7/00*  (2006.01)
*G06G 7/20*  (2006.01)

(52) U.S. Cl.
USPC .......................................... 713/193; 713/194

(58) Field of Classification Search
USPC .................... 726/2, 26, 27, 34; 713/189, 194; 380/59; 701/45; 180/173
See application file for complete search history.

(56) References Cited

U.S. PATENT DOCUMENTS
5,787,367 A * 7/1998 Berra .................................. 701/1
5,912,512 A * 6/1999 Hayashi et al. ............... 307/10.5
(Continued)

FOREIGN PATENT DOCUMENTS
DE  197 23 332  6/1997
DE  199 58 564  12/1999
(Continued)

*Primary Examiner* — David Garcia Cervetti
*Assistant Examiner* — Fatoumata Traore
(74) *Attorney, Agent, or Firm* — Staas & Halsey LLP

(57) ABSTRACT

The invention relates to a method for protecting at least one motor vehicle component against manipulation in a control device, which comprises at least one microcomputer (μC) and at least one memory module (2, 3), characterized in that the code which is necessary for operation of the control device (1) is divided into at least one master code (MC) which comprises information essential for operation of the control device (1), and at least one sub-code (SC) which comprises additional information for operation of the control device (1), at least the master code (1) being stored in the microcomputer (μC) and the master code (MC) monitoring the manipulation of the sub-code (SC). The invention furthermore relates to a control device for a motor vehicle component which comprises at least one microcomputer (μC) and at least one memory module (2, 3), the code which is necessary for operation of the control device (1) being divided into at least one master code (MC) which comprises information which is essential for operation of the control device (1), and at least one sub-code (SC) which comprises additional information for operation of the control device (1), and at least the master code (MC) being stored in the microcomputer (μC) and the master code (MC) containing a software function module for detection of manipulation within the sub-code (SC).

14 Claims, 2 Drawing Sheets

(56) References Cited

U.S. PATENT DOCUMENTS

| | | | | |
|---|---|---|---|---|
| 6,081,755 A * | 6/2000 | Fujimoto | | 701/1 |
| 6,715,049 B1 * | 3/2004 | Hayakashi | | 711/163 |
| 6,816,953 B2 * | 11/2004 | Hurich | | 711/163 |
| 7,062,652 B2 * | 6/2006 | Hirota et al. | | 713/172 |
| 7,100,036 B2 * | 8/2006 | Schwartz | | 713/2 |
| 7,313,703 B2 * | 12/2007 | Beuten et al. | | 713/187 |
| 2001/0027524 A1 * | 10/2001 | Krauter et al. | | 713/200 |
| 2003/0037213 A1 * | 2/2003 | Mittag et al. | | 711/163 |

FOREIGN PATENT DOCUMENTS

| | | |
|---|---|---|
| DE | 199 63 210 | 12/1999 |
| DE | 199 63 468 | 12/1999 |
| DE | 100 08 974 | 2/2000 |
| DE | 100 20 977 | 4/2000 |
| EP | 957016 A1 * | 11/1999 |
| GB | 2 285 702 | 7/1995 |

* cited by examiner

METHOD FOR PROTECTING A MOTOR VEHICLE COMPONENT AGAINST MANIPULATIONS IN A CONTROL DEVICE AND CONTROL DEVICE

This application is a §371 application of PCT/EP03/08023, which claims priority from DE 10238094.5.

BACKGROUND

This invention relates to a method for protecting at least one motor vehicle component against manipulation in a control device, and a control device.

In motor vehicles, control devices, such as for example the engine control device or the transmission control device, are currently used to control individual motor vehicle components. The information which is required for operating these control devices, such as programs and data, are stored encrypted or unencrypted in memory modules ($E^2$PROM, flash and the like). The encryption process is independent of a fixed hardware combination of modules and is generally stored in a rewritable storage medium.

The disadvantage of these control devices and of the programs used is that individual memory modules can be replaced or the data on the memory modules can be overwritten via a diagnosis interface or via direct access to the memory module. The replacement of a memory module or overwriting of the data and programs stored on this memory module can lead to the motor vehicle components operating with other characteristics. This is done for example in so-called chip tuning in which the memory modules which are assigned to the engine control device are replaced or the programs and data stored on these memory modules, such as characteristics, are changed. As a result, the output and/or the torque of the engine can be increased for example. If this manipulation is done without adapting the other motor vehicle components, such as the oil cooler, turbocharger, or brakes, damage to these motor vehicle components and safety-critical states can occur.

SUMMARY OF THE INVENTION

The object of this invention is therefore to devise a control device for motor vehicle components and a process for protection against manipulation of a control device, in which replacement of a memory module and changing of the data on the memory module are not possible without affecting the operability of the control device or at least diagnosing the change and optionally displaying it.

The invention is based on the finding that this object can be attained by the data and programs which are necessary for operation of the control device being stored in different memories.

The object of the invention is therefore attained by a process for protection against manipulation in a control device for at least one motor vehicle component, the code necessary for operation of the control device being divided into at least one master code which comprises information essential for operation of the control device, and at least one sub-code which comprises additional information for operation of the control device, at least the master code being stored in the microcomputer and the master code monitoring the manipulation of the sub-code.

By dividing the code which is necessary for operation of the control device, on the one hand the part which for example must be reprogrammed or updated during repairs can be made accessible without the part which contains information which is essential for operation of the control device having to be accessible. Furthermore, by dividing the code, the code can be stored in different memories; this entails an increase in security against manipulation. The master code may for example constitute the actual control program which comprises the computation of engine load and rpm and the actuating variables and outputs with access to characteristics and control signal generation for connected actuators of the control device. The sub-code may then contain the program for measures which improve exhaust and comfort, for example. In addition or as an alternative the two codes may contain data.

By preference the master code is stored in a read-protected OTP (one-time-programmable) area of the microcomputer which is writable only once. With this, on the one hand unauthorized alteration of the master code is impossible and on-the-other hand copying of the software which is necessary for operation of the control device can be avoided.

The sub-code can be stored in a rewritable area of the microcomputer or in a rewritable area of an external memory module. In this way the sub-code can be updated or reprogrammed. However, the monitoring function against manipulation contained in the master code prevents unauthorized alteration of the sub-code.

Furthermore, the object underlying the invention is attained by a control device for a motor vehicle component which comprises at least one microcomputer ($\mu$C) and at least one memory module, the code which is necessary for operation of the control device being divided into at least one master code which comprises information which is essential for operation of the control device, and at least one sub-code which comprises additional information for operation of the control device, and at least the master code being stored in the microcomputer and the master code containing a software function module for detection of manipulation within the sub-code.

The software function module can comprise for example linear or CRC checksum formation, hash value formation or an encryption process.

By preference at least one part of the sub-code is stored encrypted on a rewritable area and the master code is used to generate a key for decryption. The part of the sub-code which is stored encrypted can for example constitute a fingerprint.

Features and details which are described in conjunction with the process as claimed in the invention apply accordingly to the control device as claimed in the invention and vice versa.

BRIEF DESCRIPTION OF THE DRAWINGS

The invention will be described in greater detail below with the aid of possible embodiments illustrated in the attached drawings in which:

FIG. 1 shows one embodiment of the control device as claimed in the invention. The configuration of control devices, such as for example engine control devices, has been known for a long time from the prior art, so that it is detailed only to the extent necessary for the understanding of the invention. The control device 1 in this embodiment comprises a microcomputer $\mu$C, a flash memory 2 and an EEPROM ($E^2$PROM) 3. The flash memory 2 and the $E^2$PROM 3 each have an OTP area 21, 31. The latter are preferably configured not to be read-protected. There is also an OTP area 11 in the μC.

Figure 1:
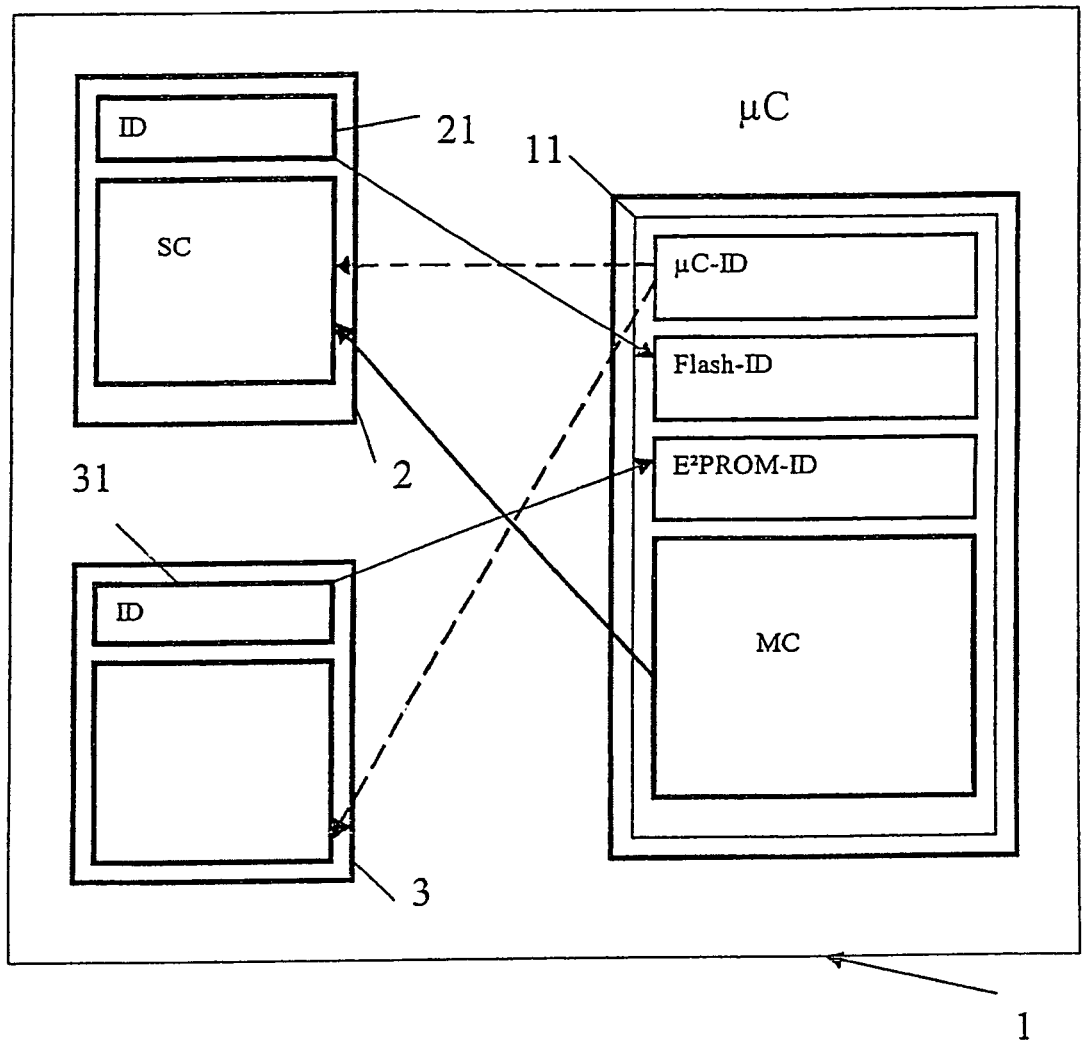
FIG. 1 shows a schematic block diagram of one embodiment of the control device as claimed in the invention.

The memory modules flash 2, E²PROM 3 in this embodiment are provided with identification numbers ID which are specific to the module. They are generally written at the manufacturer of the module and are stored in the OTP area 21, 21 of the individual modules.

DETAILED DESCRIPTION OF THE INVENTION

In the process of manufacturing the control device, when the control device is started up for the first time the IDs of the individual memory modules 2, 3 are read out by the microcomputer μC and are stored in the OTP area 11 of the μC which area is writable only once. Starting from this time, operation of the control device 1 is only possible in conjunction with the IDs of the external memory modules 2, 3, which IDs are known to the μC.

With each additional start-up of the control device 1, the μC again reads out the ID of all of the memory modules 2, 3 connected to it. In a comparison unit these current IDs may then be compared to the original identifiers which are stored in the OTP area 11 of the μC. If it is established in this comparison that one of the IDs does not agree with one of the original IDs, the control device is prevented from operating or at least the change is diagnosed and optionally displayed.

The code for operating the control device is divided into a master code (MC) and a sub-code (SC). The master code MC contains elementary, essential functionalities for operating the control device, for example the program for generating signals for the connected actuators (not shown) of the control device or the program for computing the actuating variables and outputs. The master code MC can furthermore comprise data. In the sub-code SC additional programs and data are contained. The control device can only operate using both codes, MC and SC. In the illustrated embodiment, the sub-code SC is contained in a rewritable area of the flash memory 2. The master code MC is contained in the OTP area 11 of the microcomputer μC. The master code is preferably protected against read-out by way of contact-making. This can be achieved either physically by failure of a transistor channel or by circuit engineering. The sub-code SC in contrast to the master code MC can be modified or overwritten. This allows updating of the sub-code or reprogramming.

Furthermore the μC has an identification number μC-ID. It is also stored in the read-protected OTP area of the μC. In the E²PROM other data for operating the control device are stored in a rewritable area. These data may for example constitute adaptation values and idle rpm for an engine control device.

When the control device is initialized, the microcomputer μC learns the identification numbers which have been stored in the OTP area 21, 31 of the memory modules 2, 3 and which thus cannot be changed, and stores them in the OTP area of the microcomputer μC which can also optionally be configured as read-protected.

From this time on, the memory modules 2, 3 which are connected to the microcomputer are known to the microcomputer μC via their ID.

In addition, the IDs of the memory modules stored in the microcomputer can also be used for encryption of data or programs. Thus, the data stored on the E²PROM can be encoded for example by a symmetrical encryption process in which the key comprises at least part of the ID of at least one of the memory modules 2, 3. In an engine control device the E²PROM can store for example learned values, production data, and adaptation values. Basically all symmetrical encryption processes which allow incorporation of an identifier which is specific to the control device are suited for encryption. Preferably the data of the E²PROM are encrypted by a key which in addition or as an alternative to the ID of the external memory modules comprises the ID of the microcomputer μC. This effects encryption which is specific to the control device and which makes it impossible to replace the E²PROM or overwrite the data stored on it or prevents operation of the control device after such manipulation. The key is preferably stored in the RAM of the microcomputer μC. In this way the key is generated each time the control device boots up with the incorporation of an identifier which is specific to the control device (for example the ID of the μC and optionally the IDs of the memory modules) and thus the key is specific to the control device.

Furthermore the sub-code SC can be stored wholly or partially encrypted on the flash memory 2. For this encryption the ID of the individual memory modules or of the microcomputer or part of this ID can also be integrated into the key. The decryption of the data in the sub-code is done by the master code. Since the latter is stored in a read-protected area of the microcomputer, read-out of the program and thus copying of the software can be prevented.

Monitoring of the sub-code relative to manipulation which is ensured by the μC in the master code can also take place by way of processes other than encryption. Thus, as an alternative or in addition, linear/CRC checksum formation or hash value formation can be used. To detect completed manipulation of the data and optionally of parts of the sub-code, linear checksums are formed for example over selected areas and the result which has been encrypted as a fingerprint is placed in the sub-code. The master code in control device operation, for example when there is a signal on the terminal 15, over the same predefined area computes the comparison value (for example, linear checksum) and checks it against the decrypted reference value which has been stored encrypted in the sub-code. The type of manipulation detection may be selected arbitrarily.

After detecting manipulation, the master code initiates measures which may lead to control device failure.

Figure 2:
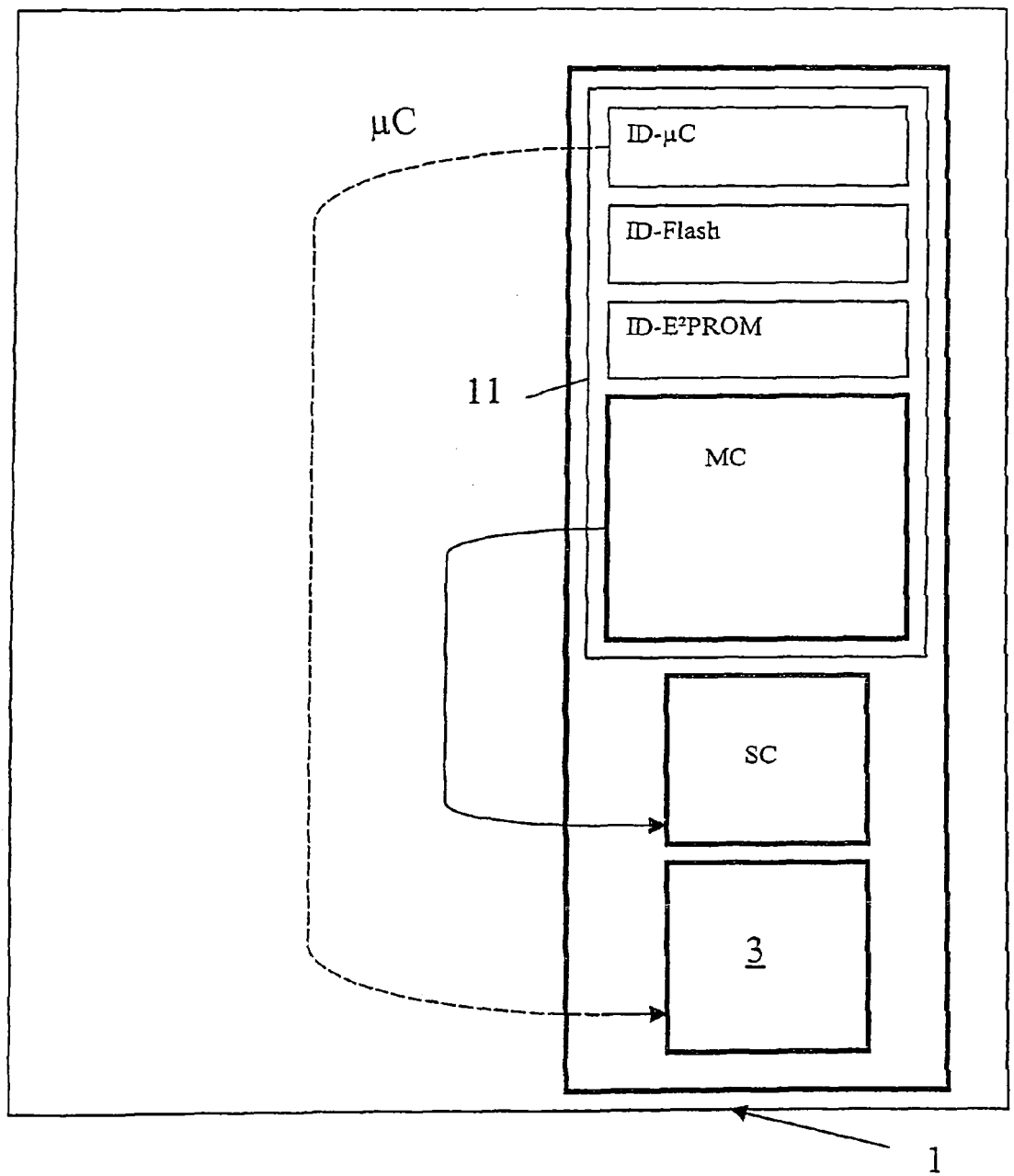
FIG. 2 shows a schematic block diagram of another embodiment of the control device as claimed in the invention.

FIG. 2 shows another embodiment of the control device as claimed in the invention. In this embodiment the memory modules 2 and 3 are integrated into the microcomputer μC. The μC here has an embedded flash memory, the E²PROM being emulated. This configuration of the control device does have the advantage that replacement of the memory modules can be reliably prevented, in any case the data in the emulation of the E²PROM can be overwritten only block by block.

The process for protection against manipulation takes place in this control device with an internal memory essentially analogous to the one described in the foregoing for control devices with external memories. Here in particular the data of the emulated E²PROM can be stored encrypted and can be decrypted by a key which comprises at least one individual identifier of the control device, such as the μC-ID and/or the flash ID. Likewise the encrypted data or fingerprints contained in the sub-code which is stored in the flash memory of the μC can be decrypted by the master code. In this instance preferably an identifier which is specific to the control device is also integrated in the key.

The invention is not limited to the described embodiments. Thus the identifier of the individual memory modules can be for example the date of manufacture of the control device. This may prevent manipulation during the warranty period.

The control device for the purposes of this invention can constitute for example an engine control device, a transmission control device or a combination instrument.

A large number of advantages can be achieved compared to conventional control devices with the process as claimed in the invention and the control device as claimed in the invention.

With the control device as claimed in the invention, replacement of one or more modules can be reliably prevented since operation of the control device can be prevented by this replacement. It is not possible to read out a part of the program or data which is essential for operation of the control if this part is stored in a read-protected OTP area. Thus copying and modification of the software can be prevented. Access to confidential data via contact-making with the module is not possible either if they are stored in the read-protected OTP area of the μC. The control device can be protected against manipulation especially reliably by its being able to run only in the combination of the master code and sub-code. Changing the sub-code which is stored in the reprogrammable, optionally external memory, for example the flash memory, without adapting the master code leads to control device failure. Furthermore, data, which are stored for example on an E²PROM, can be encrypted in a manner specific to the control device. The decryption of these data can also be made dependent on the identifier of the control device. Additional security can be achieved by the encryption and decryption being made dependent on the combination of the individual modules with the IDs which are known to the μC.

In summary, it can therefore be stated that by dividing the codes into a master code and a subcode the manipulation of control devices, such as for example chip tuning in engine control devices, can be reliably prevented.

The invention claimed is:

1. A process for protecting at least one motor vehicle component against manipulation, said process comprising:
dividing a code necessary for operation of a control device of the at least one motor vehicle into a plurality of code portions,
wherein at least one code portion is a master code which comprises information essential for operation of the control device, and
wherein at least one code portion is a sub-code which comprises additional information for operation of the control device; storing the sub-code in a first memory module; storing at least the master code in a second memory module; upon an initial startup of the control device,
reading an initial identification number stored in a one-time programmable area of the first memory module, and
storing the initial identification number in the second memory module as a stored identification number; and
upon subsequent startups of the control device, causing the master code to monitor manipulation of the sub-code by reading a second identification number stored in a one-time programmable area of a third memory module, and
comparing the stored identification number to the second identification number.

2. The process as claimed in claim 1, wherein the second memory module comprises a read-protected area of the microcomputer which is writable only once.

3. The process as claimed in claim 1, wherein the first memory module comprises a rewritable area of the microcomputer.

4. The process as claimed in claim 1, wherein the first memory module comprises a rewritable area of at least one external memory module.

5. The process as in claim 1, wherein said master code is stored in a read provided area of said microcomputer, which is writable only once.

6. A control device for a motor vehicle comprising:
at least one microcomputer, having a first memory module;
wherein a code which is necessary for operation of the control device is divided into a plurality of code portions,
wherein at least one code portion is a master code which comprises information which is essential for operation of the control device, and
wherein at least one code portion is a sub-code which comprises additional information for operation of the control device,
wherein at least the master code is stored in the first memory module,
wherein the sub-code is stored in a second memory module, and
wherein the master code contains a software function module for detection of manipulation within the sub-code such that upon initialization, an identification number of the second memory module is read from the second memory module and stored as a stored identification in a one-time writable area of the first memory module and thereafter, upon start-up, the identification number of the second memory module is compared with the stored identification.

7. The control device as claimed in claim 6, wherein the master code is stored in a read-protected area of the first memory module which is writable only once.

8. The control device as claimed in claim 6, wherein the microcomputer comprises the second memory module.

9. The control device as claimed in claim 6, wherein the second memory module is external to the microcomputer.

10. The control device as claimed in claim 6, wherein at least one part of the sub-code is stored encrypted in a rewritable area and the master code is used to generate a key for decryption.

11. A device for operating a control device of a motor vehicle, wherein the device is functional to prevent a manipulation of said control device, the device comprising:
a microcomputer and
at least one module comprising a code required to operate said control device,
wherein the code is divided into at least
a master code and
a sub-code,
wherein said master code is stored in a first memory,
wherein said sub-code is stored in a second memory, and
wherein said master code is functional to monitor manipulation of said control device such that upon initialization, an identification number of the second memory module is read from the second memory module and stored as a stored identification in a one-time writable area of the first memory module and thereafter, upon start-up, the identification number of the second memory module is compared with the stored identification.

12. The device according to claim 11, wherein sub-code is stored in a rewritable area of said microcomputer.

13. The device according to claim 11 wherein said sub-code is stored in a rewritable area of at least one external memory module.

14. The device according to claim 11 wherein at least one part of said sub-code is stored encrypted in a rewritable area and said master code is operable in decrypting said sub code.

* * * * *